United States Patent
Upadhayaya et al.

(10) Patent No.: US 8,959,600 B2
(45) Date of Patent: Feb. 17, 2015

(54) PROXY DATA VIEWS FOR ADMINISTRATIVE CREDENTIALS

(71) Applicant: Oracle International Corporation, Redwood Shores, CA (US)

(72) Inventors: Anadi Upadhayaya, Hyderbad (IN); Ty Hayden, Grand Junction, CO (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 13/753,087

(22) Filed: Jan. 29, 2013

(65) Prior Publication Data

US 2014/0215581 A1     Jul. 31, 2014

(51) Int. Cl.
  *H04L 29/06*     (2006.01)
(52) U.S. Cl.
  CPC ................................. *H04L 63/104* (2013.01)
  USPC .......................................................... 726/5
(58) Field of Classification Search
  CPC .............................................. H04L 63/0884
  USPC ............................................................ 726/5
  See application file for complete search history.

(56) References Cited

U.S. PATENT DOCUMENTS

| | | |
|---|---|---|
| 7,231,595 B1 | 6/2007 | Fujino et al. |
| 7,506,001 B2 | 3/2009 | Johnson et al. |
| 2002/0147813 A1 | 10/2002 | Teng et al. |
| 2003/0004790 A1* | 1/2003 | Calderaro et al. ............... 705/11 |
| 2008/0177635 A1 | 7/2008 | Handel |
| 2008/0229383 A1 | 9/2008 | Buss et al. |
| 2008/0240450 A1* | 10/2008 | Bayley et al. .................... 381/56 |
| 2009/0011780 A1 | 1/2009 | Salinas et al. |
| 2009/0064280 A1 | 3/2009 | Babeanu et al. |
| 2010/0223572 A1* | 9/2010 | Upadhyaya et al. ........... 715/777 |

OTHER PUBLICATIONS

Enterprise Software Initiaves. *LeaveTraq Quick Reference*. 2012. Retrieved from http://employees.tamu.edu/docs/benefits/leave/578LeaveTracQuickRef.pdf in Jul. 2012.

(Continued)

*Primary Examiner* — Teshome Hailu
*Assistant Examiner* — Thanh Le
(74) *Attorney, Agent, or Firm* — Kilpatrick Townsend & Stockton LLP

(57) ABSTRACT

A method of providing an administrator with a managerial view of personnel data may include receiving a login that includes administrator credentials from a personnel administrator and receiving a command associated with the administrator credentials to view personnel data in a personnel database. The personnel data may be associated with a group of employees under a manager in a managerial hierarchy. The method may also include selecting between a manager view of the personnel data and an administrator view of the personnel data. The manager view may include a first subset of the personnel data, the administrator view may include a second subset of the personnel data, and/or the first subset may be smaller than the second subset. The method may additionally include causing the first subset of personnel data to be displayed on a display device according to the manager view.

17 Claims, 10 Drawing Sheets

(56) References Cited

OTHER PUBLICATIONS

Cisco. *Cisco IP Manager Assistant With Proxy Line Support*. Retrieved from http://www.cisco.com/en/US/docs/voice_ip_comm/cucm/admin/4_0_1/ccmfeat/fsipma.html#wp1071190 in Jul. 2012.

exaltHR. *Exalt HR Product Listing*. 2011. Retrieved from http://www.exalthr.com/Systems.html in Jul. 2012.

* cited by examiner

PROXY DATA VIEWS FOR ADMINISTRATIVE CREDENTIALS

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Enterprise Software Systems can integrate internal and external management information across an entire organization. Enterprise Software Systems may be used to automate activities between these different resources within an integrated software application. One purpose may be to facilitate the flow of information between business functions across boundaries of an organization, and to manage the connections between outside stakeholders and internal resources. In this regard, one of the more useful features of Enterprise for Systems may relate to managing human resource data relating to employee compensation.

BRIEF SUMMARY

In one embodiment, a method of providing an administrator with a managerial view of personnel data within an Enterprise Software System may be presented. The method may include receiving a login that includes administrator credentials, where the administrator credentials may be associated with a personnel administrator. The method may also include receiving a command associated with the administrator credentials to view personnel data in a personnel database, where the personnel data may be associated with a group of employees under a manager in a managerial hierarchy. The method may additionally include selecting between a manager view of the personnel data and an administrator view of the personnel data. In some embodiments, the manager view may include a first subset of the personnel data, the administrator view may include a second subset of the personnel data, and/or the first subset may be smaller than the second subset. The method may further include causing the first subset of personnel data to be displayed on a display device according to the manager view.

In some embodiments, the method may also include selecting a plurality of managers using the administrator credentials, providing the plurality of managers to the display device, and receiving a selection of the manager from the plurality of managers. In some embodiments, the method may additionally include maintaining the login under the administrator credentials while the first subset of personnel data is displayed according to the manager view. In some embodiments, the method may further include recording a personnel action associated with the administrator credentials while interacting with the manager view of the personnel data in an audit log.

Additionally, the administrator need not be a manager in the managerial hierarchy. The administrator may be supervised by the manager according to the managerial hierarchy. The first subset of personnel data may include base salaries. The second subset of personnel data may include stock options. The second subset of personnel data may include some or all of the personnel data available for a plurality of employees supervised by the manager.

In another embodiment, a computer-readable memory may be presented. Then computer-readable memory may have stored thereon a sequence of instructions which, when executed by one or more processors, causes the one or more processors to provide an administrator with a managerial view of personnel data within an Enterprise Software System. The instructions may cause the processor(s) to receive a login that includes administrator credentials, where the administrator credentials may be associated with a personnel administrator. The instructions may also cause the processor(s) to receive a command associated with the administrator credentials to view personnel data in a personnel database, where the personnel data may be associated with a group of employees under a manager in a managerial hierarchy. The instructions may additionally cause the processor(s) to select between a manager view of the personnel data and an administrator view of the personnel data. In some embodiments, the manager view may include a first subset of the personnel data, the administrator view may include a second subset of the personnel data, and/or the first subset may be smaller than the second subset. The instructions may further cause the processor(s) to cause the first subset of personnel data to be displayed on a display device according to the manager view.

In yet another embodiment, a system may be presented. The system may include one or more processors and a memory communicatively coupled with and readable by the one or more processors. The memory may have stored therein a sequence of instructions which, when executed by the one or more processors, cause the one or more processors to provide an administrator with a managerial view of personnel data within an Enterprise Software System. The instructions may cause the processor(s) to receive a login that includes administrator credentials, where the administrator credentials may be associated with a personnel administrator. The instructions may also cause the processor(s) to receive a command associated with the administrator credentials to view personnel data in a personnel database, where the personnel data may be associated with a group of employees under a manager in a managerial hierarchy. The instructions may additionally cause the processor(s) to select between a manager view of the personnel data and an administrator view of the personnel data. In some embodiments, the manager view may include a first subset of the personnel data, the administrator view may include a second subset of the personnel data, and/or the first subset may be smaller than the second subset. The instructions may further cause the processor(s) to cause the first subset of personnel data to be displayed on a display device according to the manager view.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
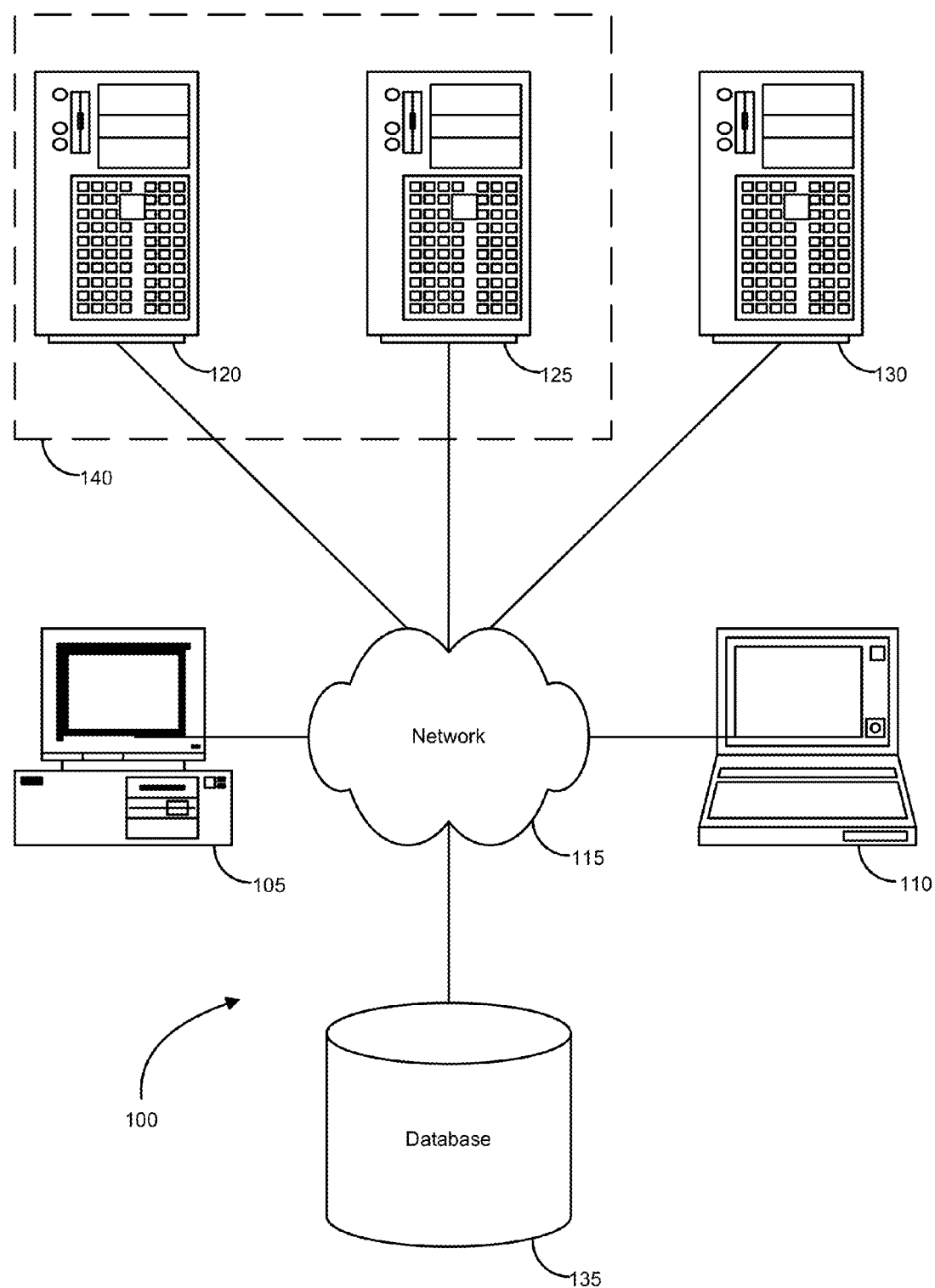
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for providing a manager's view of data to an administrator. Generally, data administrators may have access to more data than managers. While managers oversee the day-to-day interactions with employee data, administrators may occasionally need to access and/or edit the employee data as well. A manager view of the data may be limited to a subset that is relevant for that particular manager's responsibilities. In contrast, an administrator may be provided with a full view of the data as it relates to the operation of an entire organization.

When making changes to employee data, an administrator may want to see how these changes would appear to the manager of the employees. Embodiments described herein may provide methods and systems that allow an administrator to maintain his/her administrator login and view data as a proxy manager. The administrator may select a particular manager and be provided with a data view that is similar to a data view that would be shown to the selected manager.

For example, in one specific embodiment, a personnel administrator may wish to view personnel data from a department manager's view. Typically, the administrator would be granted a full view of each employee's personnel data. This may include base salaries, bonuses, stocks, stock options, benefits, performance awards, incentives, and/or the like. In contrast, a managers view may include only a base salary and/or a subset of other types of compensation. A personnel administrator may wish to increase a particular employee salary by 10%. Instead of viewing this change in relation to the entire compensation package for the employee, or in relation to the entire organization, the administrator may wish to view how the change in base salary affects certain department parameters that would be displayed to the department manager, such as a department budget, department productivity, department salary allocations, etc.

In this particular embodiment, a personnel administrator may provide administrator credentials to log into a data management system configured to manage personnel data. Once logged in, the administrator may select an option to act as a proxy manager. The administrator may select a particular manager, department, employee type, and/or the like, and choose to see a manager's view of personnel data rather than an administrator's view. The administrator may make changes to the personnel plans available via the manager's view of the compensation data, and such changes could be recorded in an audit log for later review.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
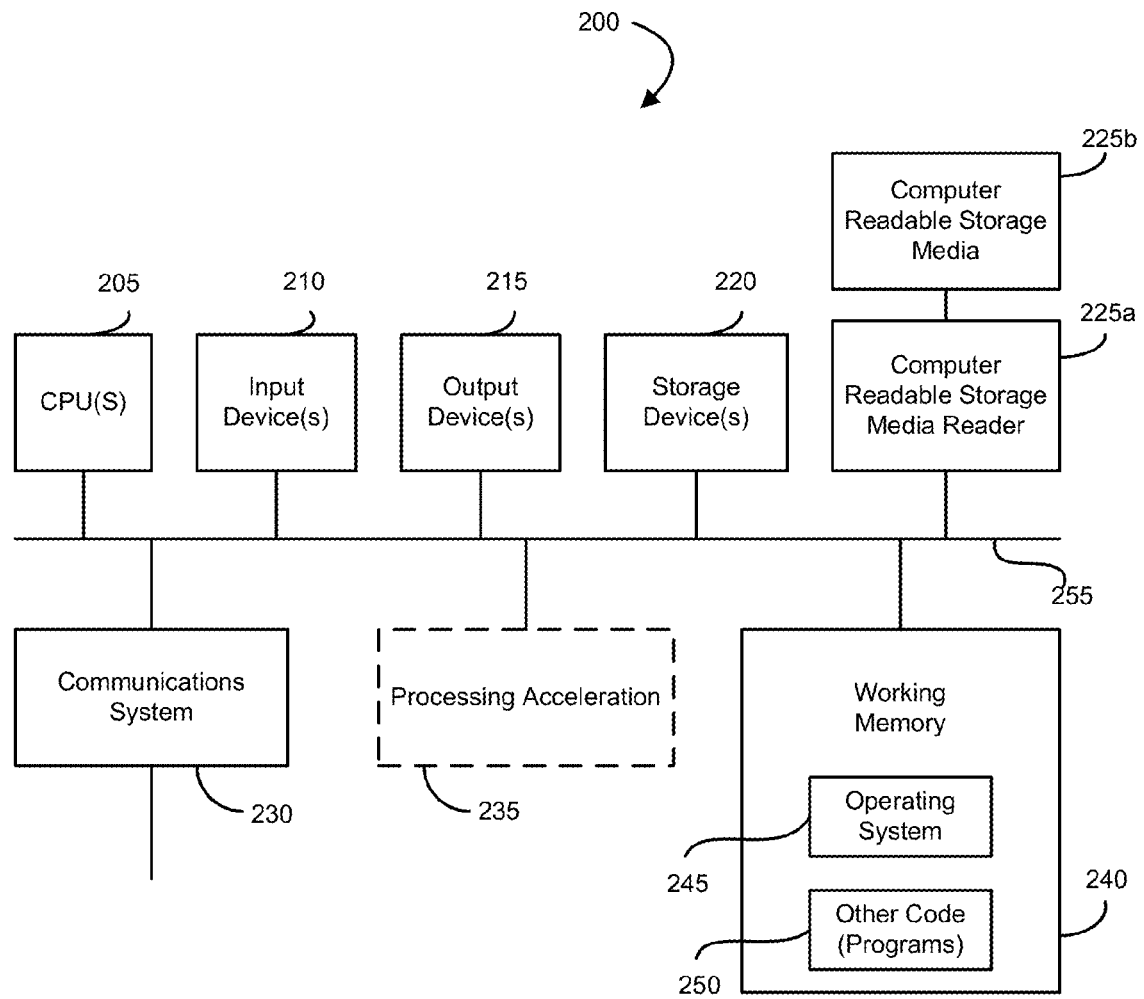
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Various embodiments described herein may be applicable to any type of data management system. These data management systems may store any type of data. Some embodiments may relate to employee data, while other embodiments may relate to operational data, financial data, product data, and/or any other data type available within an Enterprise Software System. Merely for exemplary purposes, a particular type of personnel management system will be discussed in detail herein, namely a compensation management system. Specific to this embodiment, department managers and a compensation administrator will be discussed. However, it will be understood that one having skill in the art could easily apply the same principles to other types of data management systems and other types of users in light of this disclosure. Therefore, the example of a compensation management system and a compensation administrator are not meant to be limiting, and would not be understood as such by one having skill in the art.

Figure 3:
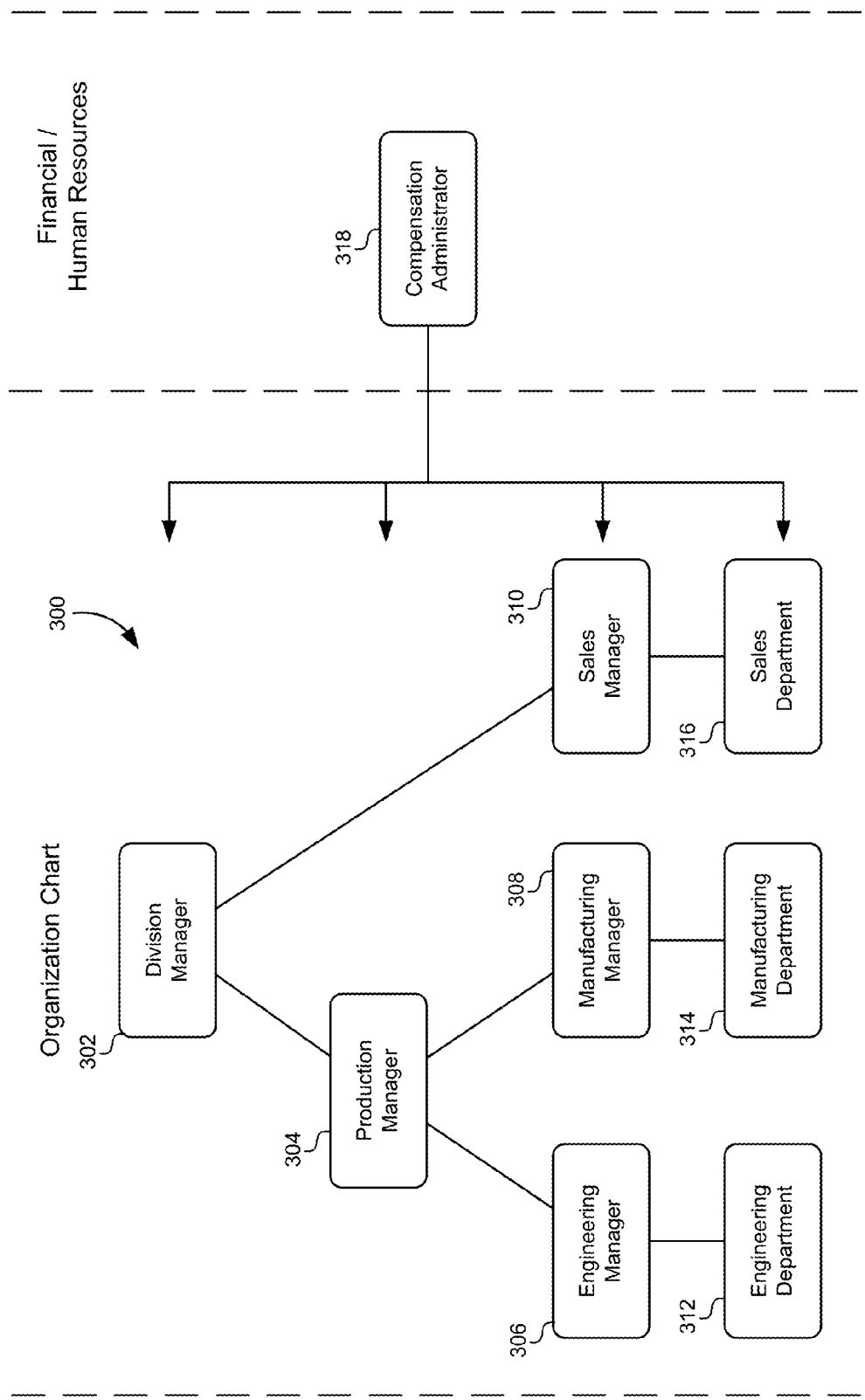
FIG. 3 illustrates a block diagram of an organizational chart, according to one embodiment.

FIG. 3 illustrates a block diagram 300 of an organizational chart, according to one embodiment. The organizational chart illustrated by block diagram 300 is hierarchical and represented by single-parent hierarchy. In this particular example, an organization may be divided into a number of departments. For example, an organization may be divided into an engineering department 312, a manufacturing department 314, and/or a sales department 316. Each department may be organized under a department manager. For example, the engineering department 312 may be organized under an engineering manager 306, the manufacturing department 314 may be organized under a manufacturing manager 308, and the sales department 316 may be organized under a sales manager 310. Each of these managers 306, 308, 310 may be referred to as level I managers within a management hierarchy.

Within the management hierarchy, these level I managers 306, 308, 310 may be organized under higher level managers. For example, the engineering department 312 and the engineering manager 306, as well as the manufacturing department 314 and the manufacturing manager 308 may be organized under a production manager 304. The production manager 304 may be referred to as a level II manager. Additionally, a division manager 302 may oversee both level I managers 306, 308, 310, as well as level II manager 304. In some cases, the division manager 302 may oversee a level I manager, such as sales manager 310, without an intervening level II manager.

This organizational chart is meant to illustrate a management hierarchy and how employees within a department may be organized underneath certain managers within the management hierarchy. In some embodiments, financial departments, human resource departments, auditing departments, and/or the like, may include employees that have significant control over employee data, yet are not managers within a particular managerial hierarchy. For example, a compensation administrator 318 may be provided as part of a financial services department, a human resources department, an audit department, and/or the like. The compensation administrator 318 may have access to employee compensation data in a plurality of departments or other employee organizations underneath managers within the managerial hierarchy. However, the compensation administrator 318 need not be a manager within the managerial hierarchy.

The compensation administrator 318 may be given certain access privileges to employee data related to employee compensation. Similarly, other types of administrators may have access to employee data under their purview as an administrator. For example, a discipline administrator may have access to disciplinary actions and histories associated with each employee while not having access to employee compensation data. Therefore, in embodiments described herein, an administrator should be considered separately from a manager according to the distinctions drawn above. Specifically, in some embodiments, an administrator of any type may have access to a wider range of a certain type of employee data than would a manager. An administrator need not be a part of a managerial hierarchy.

Figure 4:
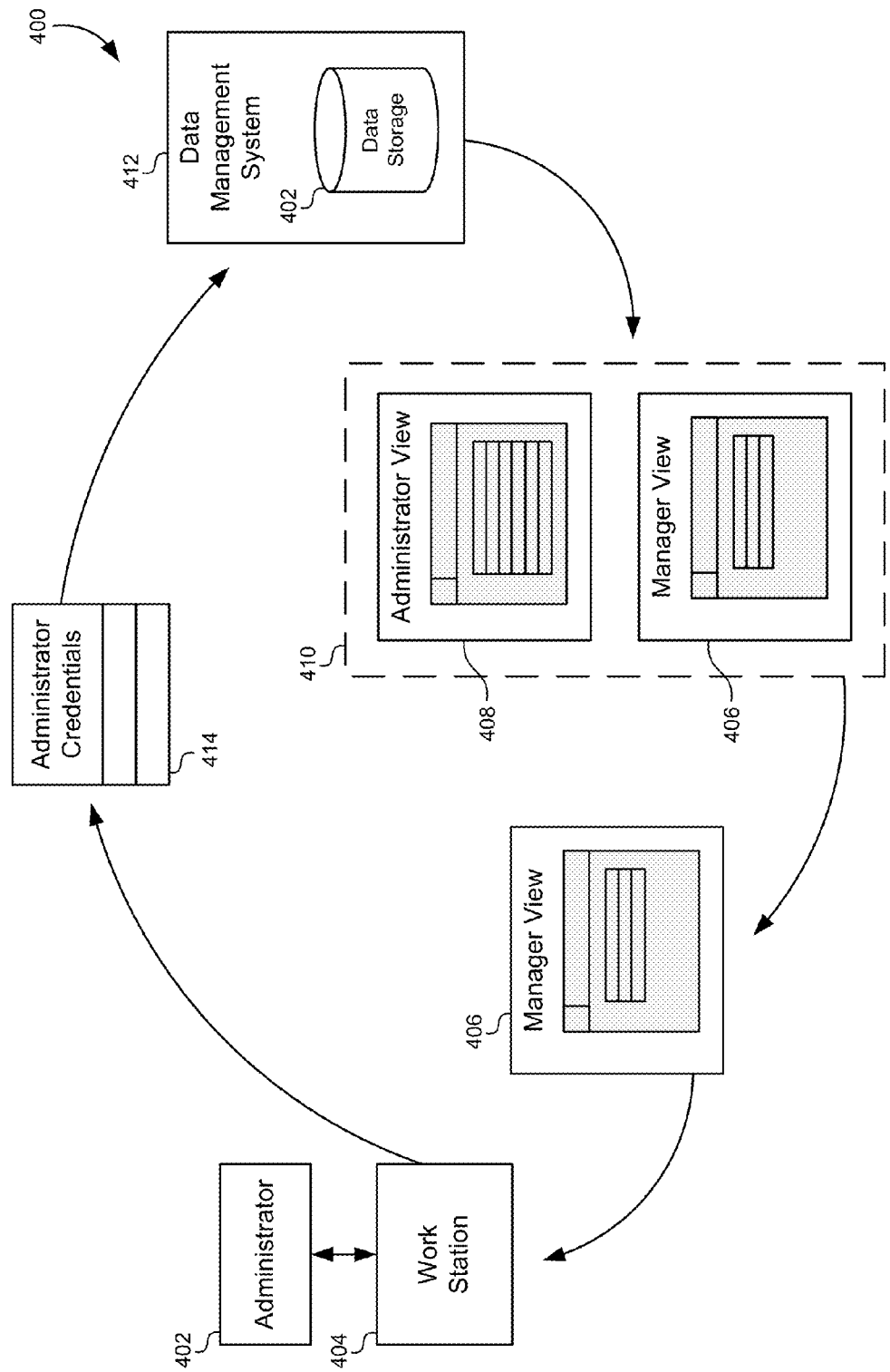
FIG. 4 illustrates a block diagram of a data management system, according to one embodiment.

FIG. 4 illustrates a block diagram 400 of a data management system 412, according to one embodiment. The data management system 412 may be a centrally located repository within a Enterprise Software System. The data management system 412 may be accessed through one or more workstations 404 that are available within an organization. The data management system 412 may provide a user interface, or may be configured to interact with a user interface displayed on the workstation 404.

In some embodiments, an administrator 402 may interact with a workstation 404 in order to interact with the data management system 412. The administrator 402 may use the workstation 404 to provide administrator credentials 414 to the data management system 412. The administrator credentials 414 may include a username, a password, a digital signature, a signed the digital challenge, a hardware configuration, a public/private encryption key, an answer to a security question, and/or the like. The security credentials 414 may be provided as part of a login operation. The login operation may be part of a single-sign-on (SSO) operation granting access to various other systems within the Enterprise Software System.

After providing the administrator credentials 414, the data management system 412 may verify the administrator credentials 414 and grant access to the administrator 402 through the workstation 404. Alternatively, an access manager, or other system within the Enterprise Software System may verify the administrator credentials 414 and establish a communication session between the workstation 404 and the data management system 412.

Once the administrator credentials 414 are verified, the administrator 402 may provide commands to the workstation 404 to retrieve, view, edit, update, modify, or otherwise access data within a data storage device 402. The data storage device 402 may be interfaced using the data management system 412. Typically, the administrator may access data related to a particular object, such as an employee, department, division, product, and/or the like.

As an administrator, the administrator 402 may receive data according to an administrator view 408. Generally, a data view may comprise of a subset of data associated with the identified object. In one embodiment, a table in relational database or set of documents in a document-oriented database may provide the subset of data for the particular view. The data view may also include a particular arrangement of data to be displayed in a user interface. Depending on the type of view, the data may be organized/ordered in different ways, and may allow for different types of interaction with the data through the interface. In some embodiments, a data view may also include elements of a traditional database view as would be understood in the art.

Multiple data views may be available from the data management system 412. In some embodiments, at least a manager view 406 and an administrator view 408 may be available. The data management system 412 may select between the administrator view 408 and the manager view 406 based on one or more factors. These factors may include a type of credentials provided by a user, a specific selection made by a user, a permission associated with the type of data, a type of interface used to access the data, a location or type of workstation used to access the data, an employment status or position held by the user accessing the data, and/or the like.

In some embodiments, the administrator 402 may select an option to act as a proxy manager using an interface displayed on the workstation 404. The data management system 412 may grant permission to act as a proxy manager based on the administrator credentials 414 and/or on the request of the administrator 402. Therefore, the data management system 412 may select a manager view 406 to present to the administrator 402 on the workstation 404.

In some embodiments, the manager view 406 and the administrator view 408 may be very similar. In some embodiments, each type of view may allow access to a subset of data associated with the requested object (e.g. compensation data associated with an employee, financial data associated with a department, etc.). In some embodiments, the subset of data associated with the administrator view 408 may be smaller than the subset of data associated with the manager view 406. In other embodiments, the subset of data associated with the manager view 406 may be smaller than the subset of data associated with the administrator view 408.

In some embodiments, either the manager view 406 or the administrator view 408 may provide more functionality than the other. For example, the administrator view 408 may allow different types of changes to its subset of data than would be allowed using the manager view. In some embodiments, the administrator view 408 may group its subset of data in ways that would be more beneficial to an administrator. For example, data may be grouped according to its relevance to an entire organization rather than to a particular department. In contrast, a manager view 406 may group data according to its relevance to a particular department.

Figure 5:
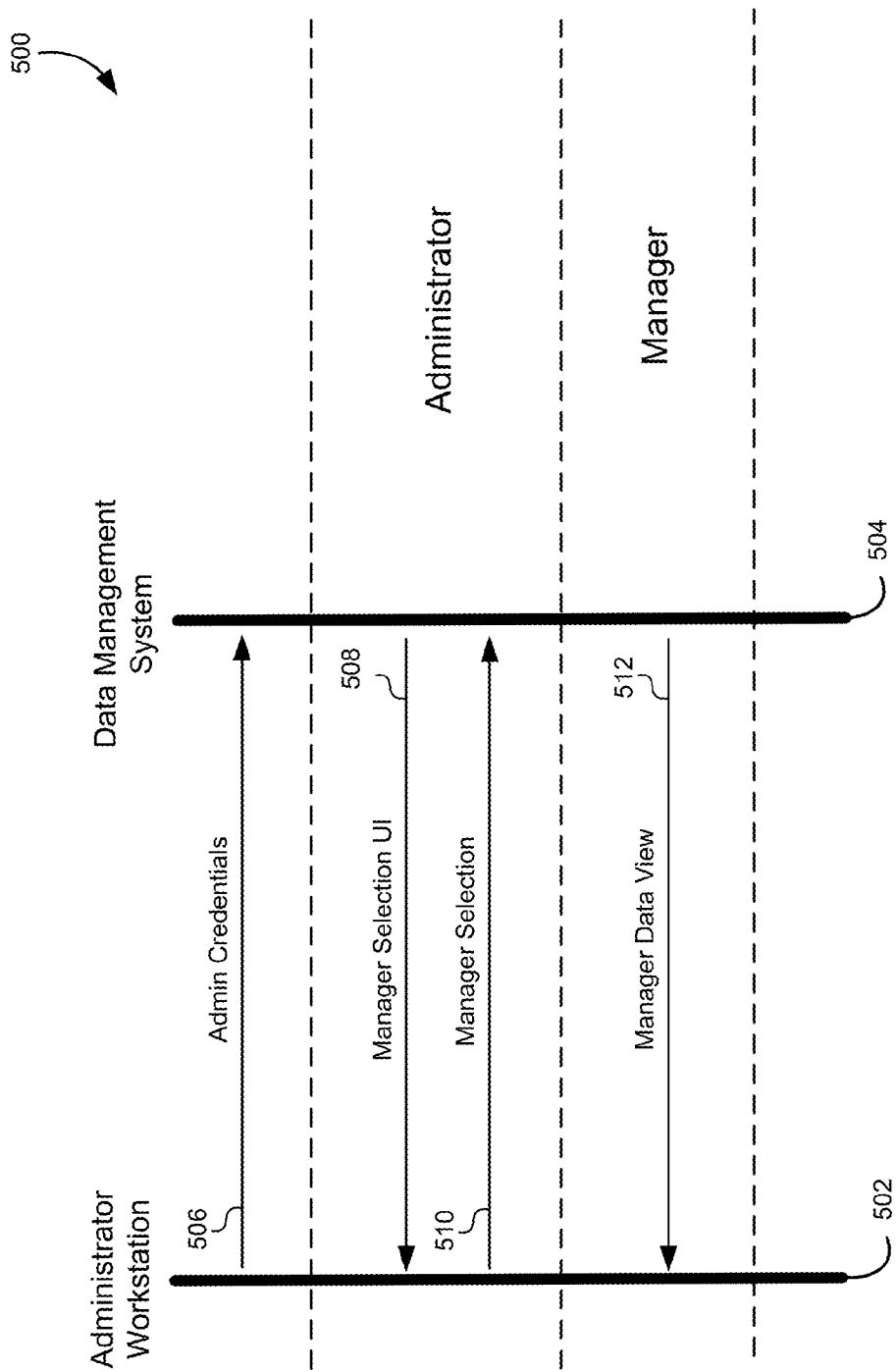
FIG. 5 illustrates a swim diagram of transactions within a data management system, according to one embodiment.

FIG. 5 illustrates a swim diagram 500 of transactions within a data management system, according to one embodiment. It will be understood that the nature, order, and labeling of these transactions is merely exemplary. In some embodiments, certain transactions may be omitted, reordered, and/or divided into sub-transactions according to the particular embodiment.

The transactions may take place between an administrator workstation 502 and a data management system 504. In some embodiments, other types of workstations, systems, networks, and/or devices may also participate in these transactions. For example, the administrator workstation may send requests through a local area network (LAN) that pass through a router, then pass through an Enterprise Gateway, and so forth. In other words, while in some embodiments the transactions take place directly between the administrator workstation 502 and the data management system 504, these transactions need not be direct in all cases.

The administrator workstation 506 may first transmit administrator credentials to the data management system 504 (506). The administrator credentials may also accompany a login request. The administrator credentials may also be transmitted in response to a request from the data management system 504 and may accompany various signing, encryption, authentication, and/or verification transactions to verify the administrator credentials.

The data management system 504 may then send data to the administrator workstation 502 that allows an administrator to select from various managers available (508). This list of managers may be determined according to the administrator credentials. For example, a compensation manager may receive a list of managers, departments, products, and/or the like, that are under the purview of the administrator as determined by the administrator credentials. The list of managers may be used to populate a user interface provided by the administrator workstation 502. Alternatively, the manager selection may be transmitted along with code for the user interface to be displayed on the administrator workstation 502

In response, the administrator workstation 502 may receive a manager selection from the administrator workstation 502 via the user interface. The manager selection may then be transmitted back to the data management system 504 (510). Although not shown in FIG. 5, it will be understood that various other selections and inputs may be received from the administrator related to the manager selection. For example, the administrator may also select the type of data to view, may provide a command to view or access data, may provide an input selecting a type of manager view, and/or the like.

The data management system may then use the inputs provided by the administrator workstation 502, including the administrator credentials and/or the manager selection to provide a manager view of the requested data (512). While the manager view is provided, the administrator workstation may transmit data changes, data additions, data deletions, and/or the like to the data management system 504. Also (not shown), the administrator workstation 502 and/or the data management system 504 may provide all of the transactions described, along with any other transactions related to data access to an audit log such that any interactions involving data stored within the data management system 504 are available for later review, audit, and/or viewing.

Figure 6:
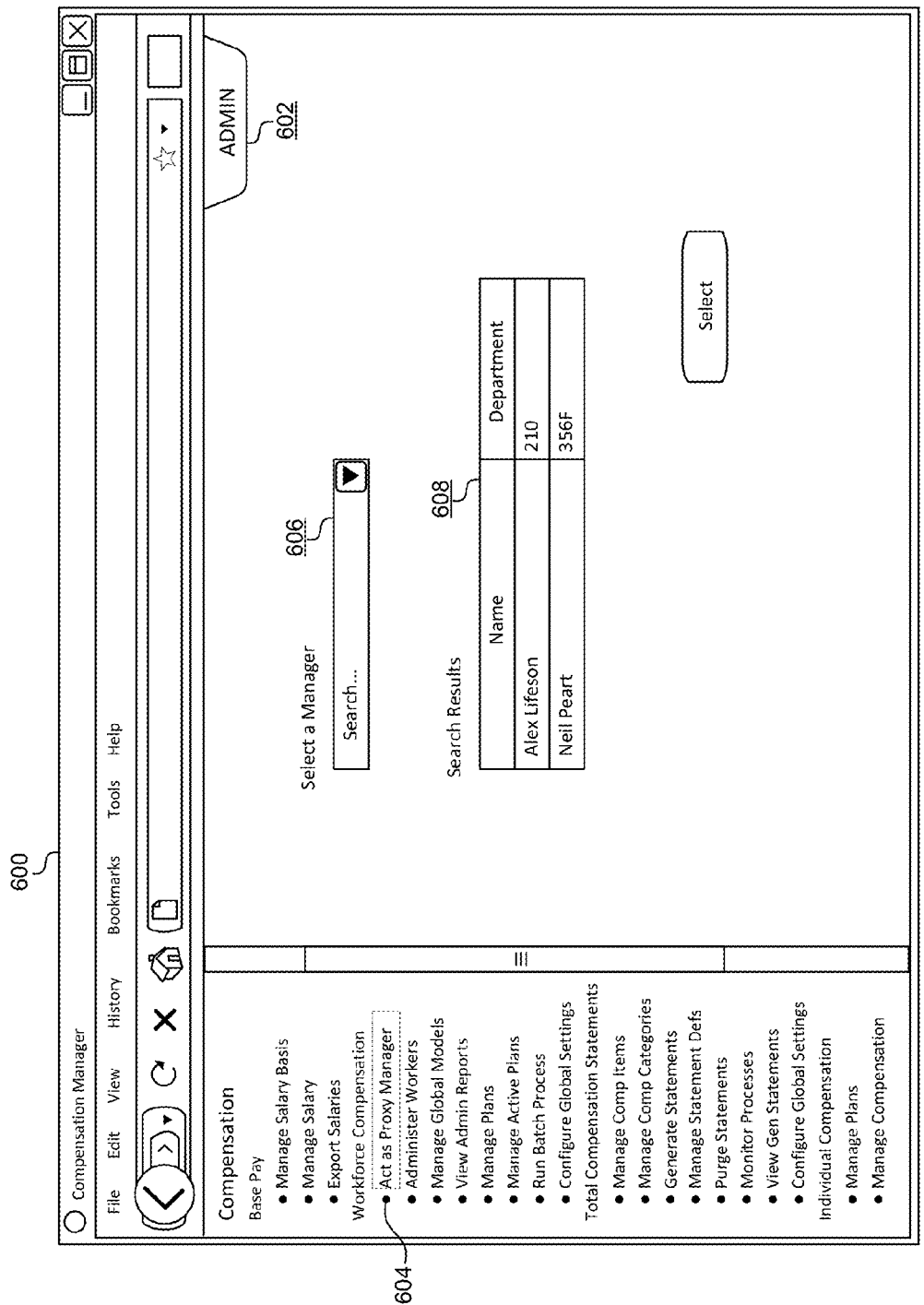
FIG. 6 illustrates an interface for acting as a proxy manager, according to one embodiment.

FIG. 6 illustrates an interface 600 for acting as a proxy manager, according to one embodiment. It will be understood that interface 600 is merely exemplary, and that the layout, features, controls, and/or data elements may be readily rearranged, replaced, and/or augmented according to the needs of each particular embodiment. Interface 600 may be part of a user interface provided by either an administrator workstation or a data management system. In this embodiment, interface 600 is implemented using a web browser. In other embodiments, interface 600 may similarly be implemented using an applet, a standalone application, a data portal, an app on a smart phone, and/or the like.

In this embodiment, the administrator may be assumed to have already logged in as an administrator, thereby providing administrator credentials that have been verified. In order to indicate that the administrator has successfully logged in, and that the administrator's login as an administrator is being maintained, indicator 602 may be provided. Indicator 602 may persist throughout the communication session where the administrator credentials are valid. In some embodiments, indicator 602 may persist while an administrator is viewing data using a manager view.

Interface 600 may include an input 604 that allows an administrator to act as a proxy manager. This particular embodiment may relate to compensation administrators, and thus the list of actions available using interface 600 may relate specifically to employee compensation. It will be understood that interface 600 may be redesigned using similar principles to interact with other types of administrators and/or data.

By selecting input 604 to act as a proxy manager, interface 600 may provide an administrator with an option to search for a manager using an input control similar to control 606. In some embodiments, control 606 may include a drop down list of available managers accessible by virtue of the administrator credentials. In some embodiments, control 606 may include a search interface whereby administrator may search for a manager according to his/her name, department, division, product type, and/or the like. In embodiments that allow an administrator to search for a manager, an output 608 may be provided to display search results. Output 608 may also operate as an input, whereby an administrator may select one or more of the search results in order to view data associated with the search results.

Figure 7:
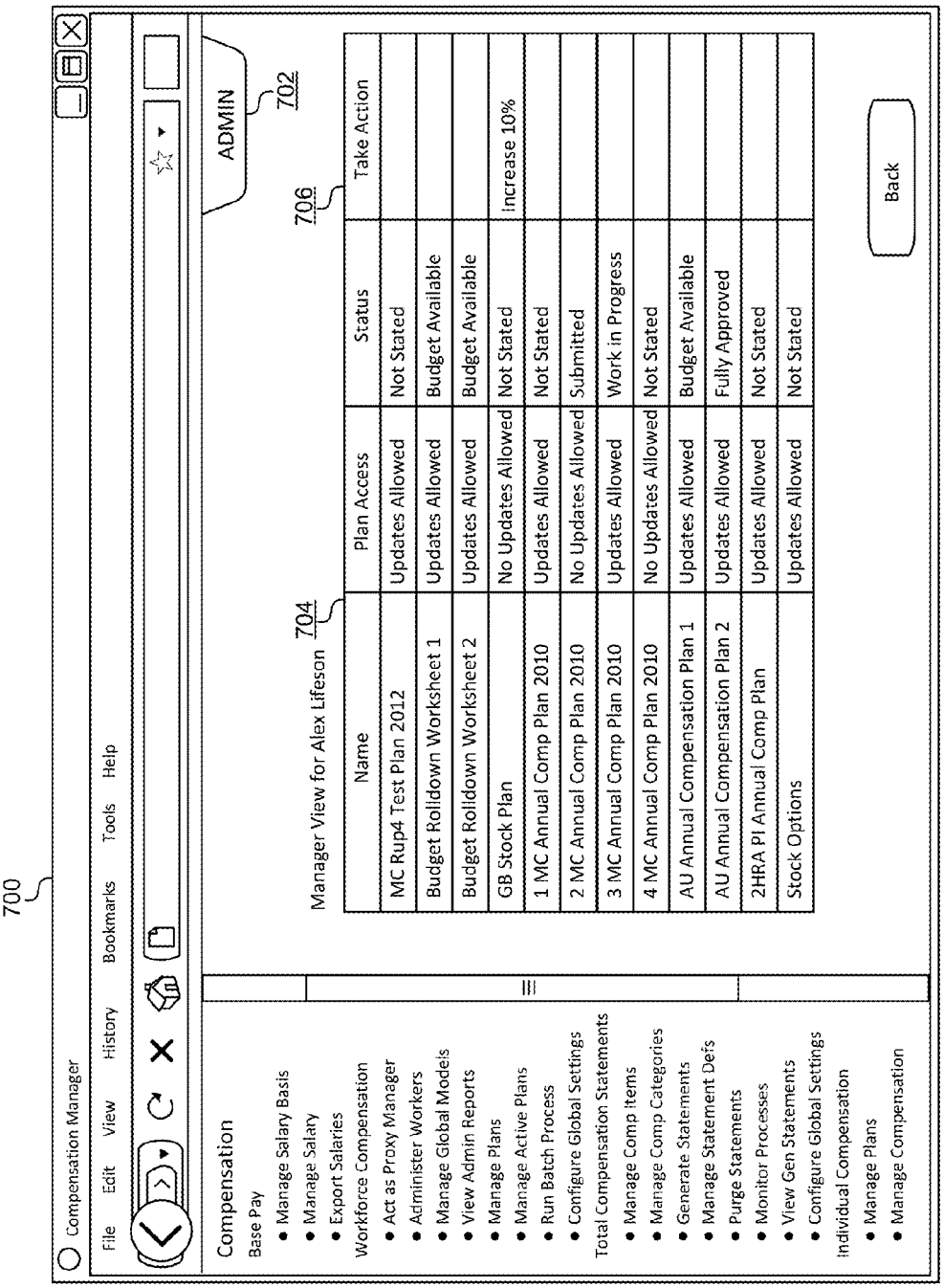
FIG. 7 illustrates an interface for viewing proxy manager data, according to one embodiment.

FIG. 7 illustrates an interface 700 for viewing proxy manager data, according to one embodiment. As was the case with interface 600, interface 700 is merely exemplary and may be reorganized according to the type of data being viewed. In interface 700, a manager view 704 of employee data associated with the selected manager ("Alex Lifeson") may be displayed. Note that indicator 702 is still provided indicating that the administrator is still logged in as an administrator while viewing the manager view 704 of the data related to the selected manager.

The manager view 704 may include data types that include sub-data. For example, the "Budget Rolldown Worksheet 1" object displayed in the manager view 704 may be selected in order to display a worksheet that includes budget data. Additionally, an access indicator may be provided that determines whether or not the administrator may provide updates, changes, and/or modifications to each particular data element available in the manager view 704. Other metadata related to each data object, such as a status, may also be provided. It will be understood that the metadata depicted in relation to manager view 704 is merely exemplary, and that any other type of information could also be provided by manager view 704.

The manager view 704 may also include an input 706 that allows the administrator to take actions related to each data object. For example, the administrator may choose to increase the value of a stock plan for each employee under the purview of manager Alex Lifeson. The actions available may be the same actions that would be available for this particular manager. In some embodiments, other actions would be available for the administrator if he were viewing the data using an administrator view rather than the manager view 704. In some embodiments, the manager view 704 may allow the administrator to perform actions or access/view data that would not be available according to an administrator view.

Figure 8:
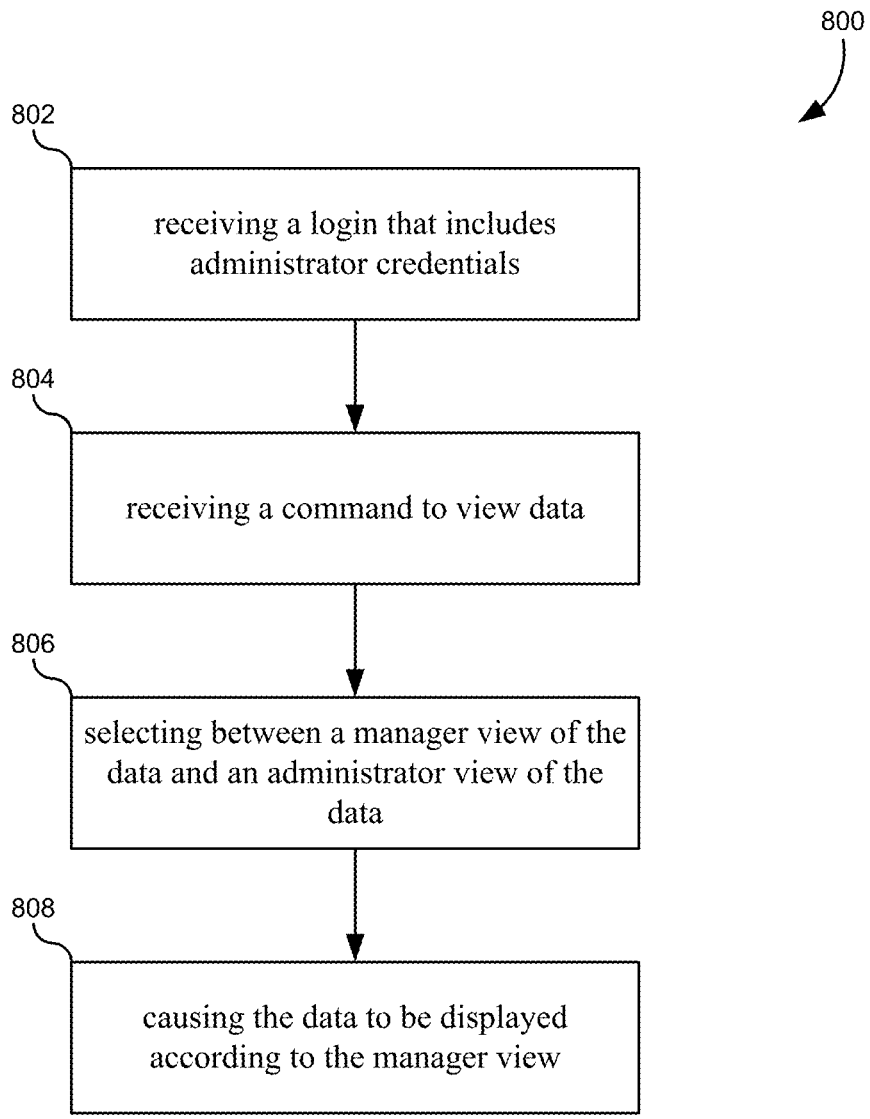
FIG. 8 illustrates a flowchart of a method of providing an administrator with a managerial view of personnel data, according to one embodiment.

FIG. 8 illustrates a flowchart 800 of a method of providing an administrator with a managerial view of personnel data, according to one embodiment. This method may be carried out using an Enterprise for System. The method may include receiving a login that includes administrator credentials (802). In a particular embodiment involving employee compensation, the administrator credentials may be associated with a personnel administrator. The personnel administrator may be distinguished from managers within a managerial hierarchy.

In some embodiments, the administrator may be a member of a department under the purview of a manager within the managerial hierarchy. In this case, the data management system may prevent the administrator from accessing, modifying, changing, or viewing data associated with his own employee record. In other embodiments, data access may be allowed to the administrator, but the access may be reduced below what would be available to the administrator when accessing the data of other departments. In some embodiments, the administrator may be prevented from accessing any data associated with his own department.

The method may also include receiving a command to view data (804). In some embodiments, the data may comprise personnel data. In other embodiments, the data may comprise product data, financial data, human resource data, and/or the like. In some embodiments, the data may be stored in a personnel database. In some embodiments, the personnel data may be associated with a group of employees under a manager in the managerial hierarchy. Alternatively, the personnel data may be associated with a group of products under the purview of the manager.

The method may additionally include selecting between a manager view of the data and an administrator view of the data (806). In one embodiment, the manager view may include a first subset of the data, and the administrator view may include a second subset of the data. In some embodiments, the first subset may be smaller than the second subset. In other embodiments, the first subset may be larger than the second subset. In some embodiments, the first subset of data may comprise a first subset of personnel data, and the second subset may comprise a second subset of personnel data.

In embodiments where the data comprises personnel data, the first subset of personnel data may comprise base salaries. The first subset of personnel data may also comprise various combinations of bonuses, salary increases, stocks, stock options, benefits, awards, performance incentives, and/or the like. In one embodiment, the second subset of personnel data may comprise stock options. Similarly, the second subset of personnel data may also comprise various combinations of bonuses, salary increases, stocks, stock options, benefits, awards, performance incentives, and/or the like. In some embodiments, the first subset and the second subset may include common elements. In some embodiments, the intersection of these subsets may be different than the union of these subsets.

The method may further include causing the data to be displayed according to the manager view (808). The data may be displayed on a display device of an administrator workstation. The data may also be displayed on a display device of any other type of computing system, such as a workstation, a smart phone, a thin client, a laptop computer, a tablet computer, a PDA, and/or the like.

Figure 9:
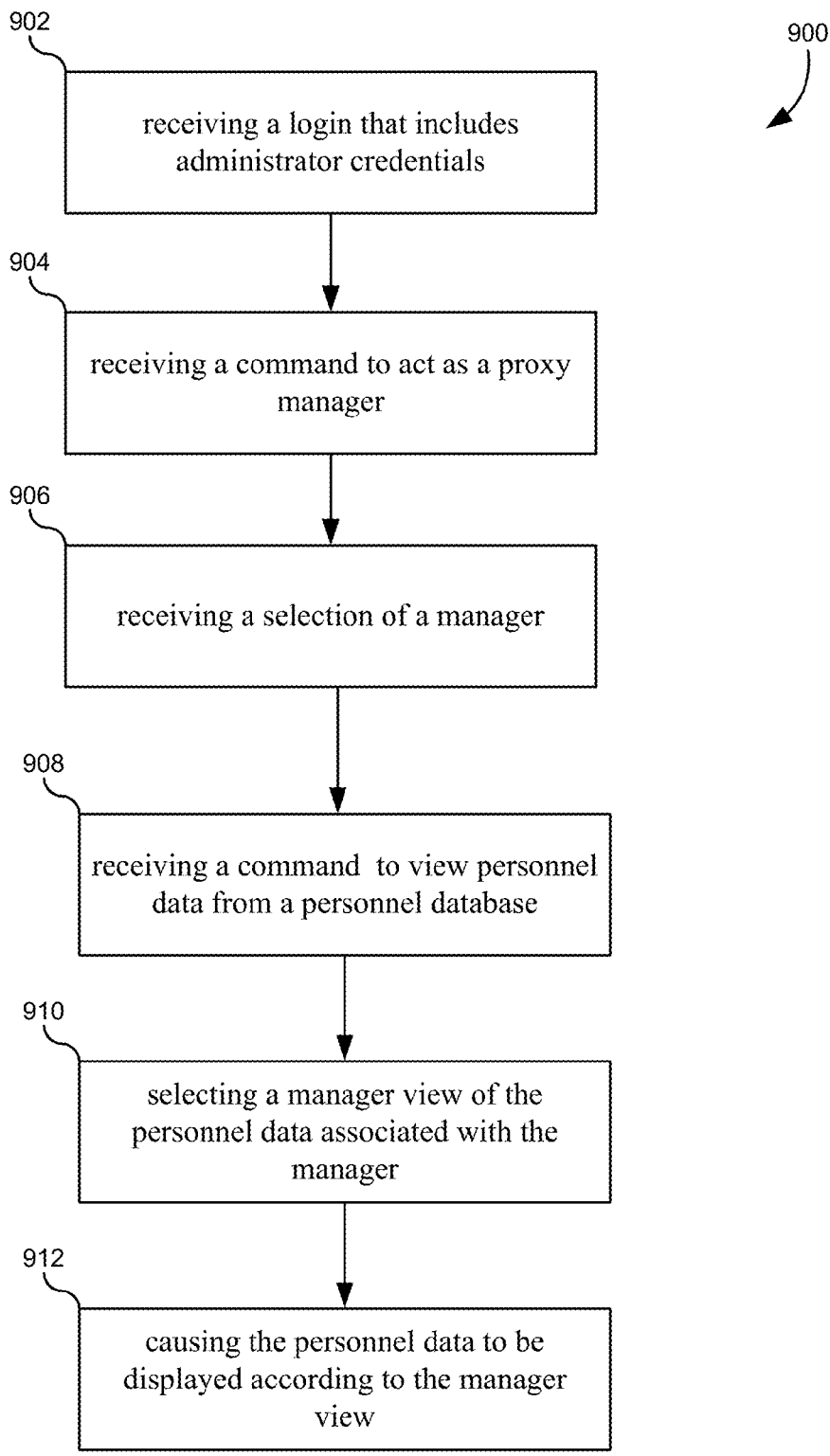
FIG. 9 illustrates a flowchart of a method of providing an administrator with a managerial view of personnel data, according to one embodiment.

FIG. 9 illustrates a flowchart 900 of a method of providing an administrator with a managerial view of personnel data, according to one embodiment. This method may include more specific steps related to particular interfaces that may be provided according to some embodiments. The method may include receiving a login that includes administrator credentials (902). The method may also include receiving a command to act as a proxy manager (904). In response to receiving the command to act as a proxy manager, additional information may be provided to an administrator related to actions that may be taken while acting as a proxy manager. For example, a data management system may provide for types of data to be selected, such as employees under the purview of a particular manager.

In one embodiment, the method may further include receiving a selection of a manager (906). The manager may be selected using information provided by the data management system. More than one manager may be selected. Managers may be selected according to a department, a product, a management type, a department type, and/or the like.

The method may also include receiving a command to view personnel data from a personnel database (908). As described above, the method may also include selecting a manager view of the personnel data associated with the manager (910). It should be noted that the manager view may be specific to each manager. Therefore, selecting a first manager may provide a first manager view, while selecting a second manager may provide a second manager view. Both the first manager view and the second manager view may be different than an administrator view available to the administrator. In some embodiments, the administrator view may provide access to more data and/or allow more actions to be taken.

The method may additionally include causing the personnel data to be displayed according to the manager view (912). In some embodiments (not shown), transactions, actions, authentications, verifications, and/or the like, associated with any steps in this method may also be recorded in an audit log. The audit log may be local to the data management system, local to the administrator workstation, or may be integrated into another system within the Enterprise Software System.

It should be appreciated that the specific steps illustrated in FIGS. 8-9 provide particular methods of accessing data according to different views according to various embodiments of the present invention. Other sequences of steps may also be performed according to alternative embodiments. For example, alternative embodiments of the present invention may perform the steps outlined above in a different order. Moreover, the individual steps illustrated in FIGS. 8-9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
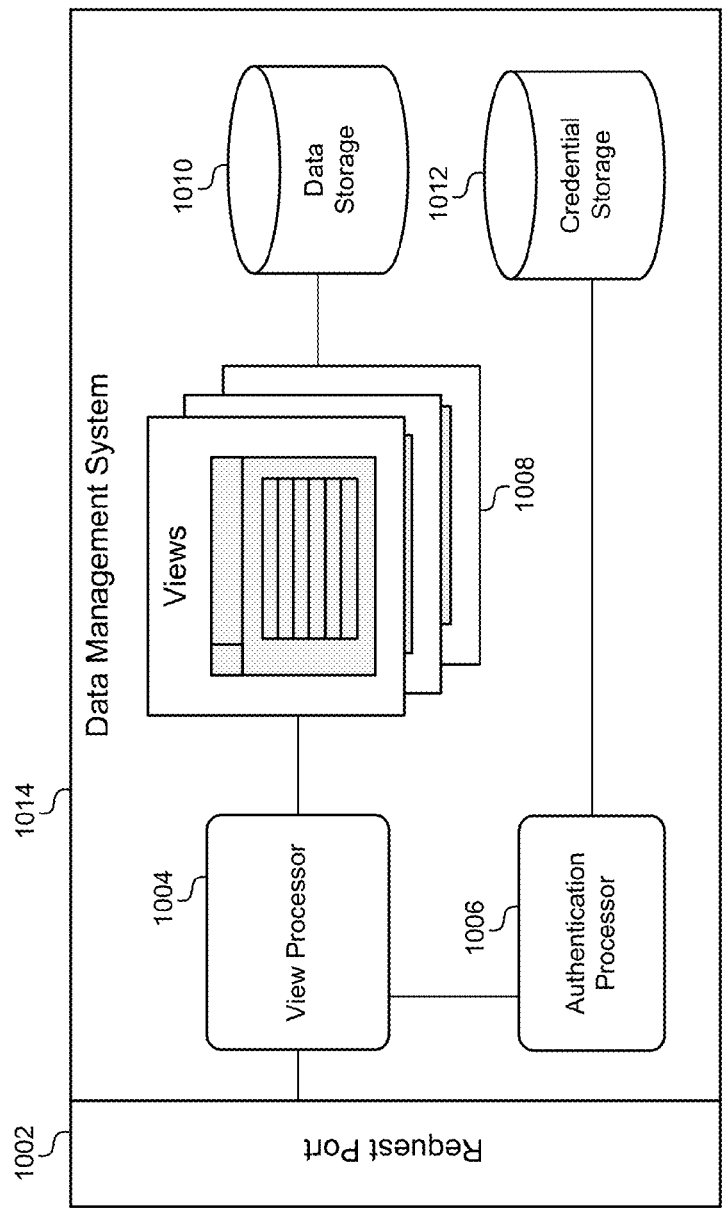
FIG. 10 illustrates a block diagram of a hardware implementation of a data management system, according to one embodiment.

FIG. 10 illustrates a block diagram 1000 of a hardware implementation of a data management system, according to one embodiment. It should be noted that each of the methods and systems described herein may be implemented using a general-purpose computer system that has been specially programmed to operate as a data management system and/or an administrator workstation. Alternatively, specialized hardware built using computer components that are well-known in the art may be designed in light of this disclosure. The block diagram 1000 depicted in FIG. 10 illustrates an organization of hardware components that may be used to design a special-purpose data management system. In some embodiments, the organization of block diagram 1000 may also be used to design specific software modules in a general purpose computer system, according to the particular embodiment.

In a hardware system, the data management system 1014 may include a request port 1002 that is configured to receive requests from an administrator workstation through a network, such as the Internet, a LAN, or a WAN. Each request may be forwarded to a view processor 1004. The view processor 1004 may receive authentication credentials as a part of the request. The authentication credentials may be sent to an authentication processor 1006 for verification/authentication. The authentication processor 1006 may use a credential storage device 1012 where data stored therein may be compared to the output of a process on the authentication processor 1006 to determine whether the authentication credentials are valid.

After authentication, the view processor 1004 may access a data storage device 1010 that is configured to store and provide access to a particular type of data. In one embodiment, the data storage device 1010 may be implemented using a database and various hardware storage elements, such as a disk array, flash memory, and/or the like. A plurality of views 1008 may be stored in the data storage device 1004, or may be generated by the view processor 1004 according to commands received to the request port 1002 and/or any administrator credentials. A particular view may be selected from the plurality of views 1008 and data may be retrieved from the data storage device 1010. The view processor 1004 may format and provide access to the retrieved data through the selected view through the request port 1002.

In one embodiment, the various modules and systems in FIG. 10 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of providing an administrator login with a managerial view of personnel data within an Enterprise Software System, the method comprising:
    receiving an administrator login that includes administrator credentials, wherein the administrator credentials are associated with a personnel administrator;
    receiving a command through the administrator login to view personnel data in a personnel database, wherein the personnel data is associated with a group of employees under a manager in a managerial hierarchy;
    receiving, through the administrator login, a selection between a manager view of the personnel data and an administrator view of the personnel data, wherein:
        the manager view includes a first subset of the personnel data;
        the administrator view includes a second subset of the personnel data; and
        the first subset is smaller than the second subset; and
    causing to be displayed, through the administrator login and on a display device, the first subset of personnel data according to the manager view or the second subset of the personnel data according to the administrator view, based on the selection.

2. The method of claim 1, further comprising:
    selecting a plurality of managers using the administrator credentials;
    providing the plurality of managers to the display device; and
    receiving a selection of the manager from the plurality of managers.

3. The method of claim 1, wherein the administrator is not a manager in the managerial hierarchy.

4. The method of claim 1, wherein the administrator is supervised by the manager according to the managerial hierarchy.

5. The method of claim 1, wherein the first subset of personnel data comprises base salaries.

6. The method of claim 1, wherein the second subset of personnel data comprises stock options.

7. The method of claim 1, wherein the second subset of personnel data comprises all of the personnel data available for a plurality of employees supervised by the manager.

8. The method of claim 1, further comprising recording a personnel action associated with the administrator credentials while interacting with the manager view of the personnel data in an audit log.

9. A non-transitory computer-readable memory comprising a sequence of instructions which, when executed by one or more processors, causes the one or more processors to provide an administrator with a managerial view of personnel data within an Enterprise Software System by:
    receiving an administrator login that includes administrator credentials, wherein the administrator credentials are associated with a personnel administrator;
    receiving a command through the administrator login to view personnel data in a personnel database, wherein the personnel data is associated with a group of employees under a manager in a managerial hierarchy;
    receiving, through the administrator login, a selection between a manager view of the personnel data and an administrator view of the personnel data, wherein:
        the manager view includes a first subset of the personnel data;
        the administrator view includes a second subset of the personnel data; and
        the first subset is smaller than the second subset; and
    causing to be displayed, through the administrator login and on a display device, the first subset of personnel data according to the manager view or the second subset of the personnel data according to the administrator view, based on the selection.

10. The non-transitory computer-readable memory according to claim 9, wherein the instructions further cause the one or more processors to provide an administrator with a managerial view of personnel data within an Enterprise Software System by:
    selecting a plurality of managers using the administrator credentials;
    providing the plurality of managers to the display device; and
    receiving a selection of the manager from the plurality of managers.

11. The non-transitory computer-readable memory according to claim 9 wherein the administrator is not a manager in the managerial hierarchy.

12. The non-transitory computer-readable memory according to claim 9 wherein the second subset of personnel data comprises all of the personnel data available for a plurality of employees supervised by the manager.

13. The non-transitory computer-readable memory according to claim 9, wherein the instructions further cause the one or more processors to provide an administrator with a managerial view of personnel data within an Enterprise Software System by recording a personnel action associated with the administrator credentials while interacting with the manager view of the personnel data in an audit log.

14. A system comprising:
    one or more processors; and
    a memory communicatively coupled with and readable by the one or more processors and comprising a sequence of instructions which, when executed by the one or more processors, cause the one or more processors to provide an administrator with a managerial view of personnel data within an Enterprise Software System by:
        receiving an administrator login that includes administrator credentials, wherein the administrator credentials are associated with a personnel administrator;
        receiving a command through the administrator login to view personnel data in a personnel database, wherein the personnel data is associated with a group of employees under a manager in a managerial hierarchy;
        receiving, through the administrator login, a selection between a manager view of the personnel data and an administrator view of the personnel data, wherein:
            the manager view includes a first subset of the personnel data;
            the administrator view includes a second subset of the personnel data; and
            the first subset is smaller than the second subset; and
        causing to be displayed, through the administrator login and on a display device, the first subset of personnel data according to the manager view or the second subset of the personnel data based on the administrator view, based on the selection.

15. The system of claim 14 wherein the instructions further cause the one or more processors to provide an administrator with a managerial view of personnel data within an Enterprise Software System by:
    selecting a plurality of managers using the administrator credentials;
    providing the plurality of managers to the display device; and receiving a selection of the manager from the plurality of managers.

16. The system of claim 14 wherein the administrator is not a manager in the managerial hierarchy.

17. The system of claim 14 wherein the second subset of personnel data comprises all of the personnel data available for a plurality of employees supervised by the manager.

* * * * *

UNITED STATES PATENT AND TRADEMARK OFFICE
CERTIFICATE OF CORRECTION

PATENT NO. : 8,959,600 B2  Page 1 of 1
APPLICATION NO. : 13/753087
DATED : February 17, 2015
INVENTOR(S) : Upadhyaya et al.

It is certified that error appears in the above-identified patent and that said Letters Patent is hereby corrected as shown below:

Title Page

On first page, column 1, under Inventors, line 1, delete "Upadhayaya" and insert -- Upadhyaya --, therefor.

On first page, column 1, under Inventors, line 1, delete "Hyderbad" and insert -- Hyderabad --, therefor.

On first page, column 2, under other publications, line 1, delete "Initiaves." and insert -- Initiatives. --, therefor.

On first page, column 2, under other publications, line 1, delete "LeaveTraq" and insert -- LeaveTrac --, therefor.

Specification

In column 10, line 50, delete "502" and insert -- 502. --, therefor.

Signed and Sealed this
Twenty-fourth Day of November, 2015

Michelle K. Lee
*Director of the United States Patent and Trademark Office*